United States Patent
Zehler et al.

(10) Patent No.: US 10,756,917 B2
(45) Date of Patent: Aug. 25, 2020

(54) SYSTEM AND METHOD FOR NETWORK SELECTION AND SERVICE PAIRING USING HISTORICAL DATA MINING

(71) Applicant: Xerox Corporation, Norwalk, CT (US)

(72) Inventors: Peter J. Zehler, Penfield, NY (US); Matthew J. Quirk, Webster, NY (US); Lawrence W. Meyer, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 205 days.

(21) Appl. No.: 15/267,516

(22) Filed: Sep. 16, 2016

(65) Prior Publication Data

US 2018/0083795 A1 Mar. 22, 2018

(51) Int. Cl.
*H04L 12/28* (2006.01)
*H04L 12/24* (2006.01)
(Continued)

(52) U.S. Cl.
CPC .............. *H04L 12/28* (2013.01); *H04L 41/12* (2013.01); *H04W 76/10* (2018.02); *H04W 4/80* (2018.02); *H04W 84/12* (2013.01)

(58) Field of Classification Search
CPC ........ H04L 12/28; H04L 41/12; H04W 76/10; H04W 4/80; H04W 84/12
See application file for complete search history.

(56) References Cited

U.S. PATENT DOCUMENTS 7,958,562 B2 6/2011 Gaucas
8,548,738 B1 10/2013 Kadous et al.
(Continued)

FOREIGN PATENT DOCUMENTS

CN 103925923 B 6/2017
JP 2009187103 A 8/2009

OTHER PUBLICATIONS

Saxena, A. et al., "Learning Depth from Single Monocular Images".
(Continued)

*Primary Examiner* — Umar Cheema
*Assistant Examiner* — James Ross Hollister
(74) *Attorney, Agent, or Firm* — Fox Rothschild LLP

(57) ABSTRACT

A method for establishing a network connection between a mobile device and a network device includes determining whether the mobile device has previously established a network connection with the network device, and determining whether the mobile device and the network device can connect using information corresponding to a previously established network connection. If the mobile device has not previously established a network connection with the network device or if the mobile device and the network device cannot connect using above information, the method includes determining whether one or more records of network connections corresponding to the network device exist, and determining if the mobile device and the network device can connect using information included in those records. If the mobile device and the network device can connect using the above information or records, the transmitter component of the mobile device establishes a new network connection with the network device.

28 Claims, 3 Drawing Sheets

(51) Int. Cl.
*H04W 76/10* (2018.01)
*H04W 84/12* (2009.01)
*H04W 4/80* (2018.01)

(56) References Cited

U.S. PATENT DOCUMENTS

| | | | |
|---|---|---|---|
| 8,583,400 | B2 | 11/2013 | Thrun et al. |
| 8,934,112 | B1 | 1/2015 | Gross et al. |
| 8,982,384 | B2 | 3/2015 | Evanitsky |
| 8,986,867 | B2 | 3/2015 | Baek |
| 9,201,619 | B2 | 12/2015 | Gross et al. |
| 9,367,271 | B2 | 6/2016 | Zehler et al. |
| 9,549,089 | B1 | 1/2017 | Tredoux et al. |
| 9,894,604 | B1* | 2/2018 | Tran ............... H04W 48/20 |
| 10,440,221 | B2 | 10/2019 | Ebner |
| 2004/0075861 | A1 | 4/2004 | Shima et al. |
| 2004/0264427 | A1* | 12/2004 | Jaakkola ........ H04L 29/12009 370/338 |
| 2006/0221901 | A1* | 10/2006 | Yaqub ............... H04W 48/16 370/331 |
| 2007/0019670 | A1* | 1/2007 | Falardeau .......... H04W 48/18 370/465 |
| 2008/0080458 | A1* | 4/2008 | Cole ................. H04W 48/18 370/342 |
| 2009/0028082 | A1* | 1/2009 | Wynn ............... H04L 63/0428 370/310 |
| 2010/0040029 | A1* | 2/2010 | Doppler ........... H04W 28/18 370/338 |
| 2011/0063663 | A1* | 3/2011 | Kim ................. G06F 3/1206 358/1.15 |
| 2011/0306364 | A1* | 12/2011 | Gossain ............ H04L 12/5692 455/456.6 |
| 2012/0075664 | A1* | 3/2012 | Nichols ............. G06F 3/1204 358/1.15 |
| 2012/0179737 | A1* | 7/2012 | Baranov ............ H04W 76/14 709/201 |
| 2013/0286942 | A1* | 10/2013 | Bonar ............... H04B 7/0689 370/328 |
| 2014/0022587 | A1 | 1/2014 | Coccia et al. |
| 2014/0256286 | A1* | 9/2014 | Rangarajan ....... H04W 12/00 455/410 |
| 2015/0189023 | A1* | 7/2015 | Kubota ............. G06F 16/9566 455/7 |
| 2015/0363141 | A1 | 12/2015 | Fernandes et al. |
| 2017/0123737 | A1 | 5/2017 | Januszewski et al. |
| 2017/0289813 | A1 | 10/2017 | Pashkov et al. |
| 2017/0347388 | A1* | 11/2017 | Cai .................. H04W 72/0493 |
| 2018/0237137 | A1 | 8/2018 | Tovey et al. |
| 2018/0316821 | A1 | 11/2018 | Ebner |

OTHER PUBLICATIONS

Godard, C. et al., "Digging Into Self-Supervised Monocular Depth Estimation".
Bhoi, A., "Monocular depth Estimation: A Survey", [cs.CV] Jan. 27, 2019.
Wu, Y. et al., "HTrack: An Efficient Heading-Aided Map Matching for Indoor Localization and Tracking", IEEE Sensors Journal, vol. 19, No. 8, Apr. 15, 2019.
Seco, F. et al., "Smartphone-Based Cooperative Indoor Localization with RFID Technology", Sensors 2018, 18, 266.
Murata M. et al., "Smartphone-based Indoor Localization for Blind Navigation across Building Complexes", 2018 IEEE International Conference on Pervasive Computing and Communications (PerCom).

* cited by examiner

SYSTEM AND METHOD FOR NETWORK SELECTION AND SERVICE PAIRING USING HISTORICAL DATA MINING

BACKGROUND

Mobile devices such as smartphones, notebook and laptop computers, PDAs (personal digital assistants), tablet computing devices, and so forth, are extremely prolific, and are extensively used to provide convenient storage and/or printing of various documents and data. Such devices are able to store documents and data of the user, and allow the user to access and transmit the stored documents to networked document processing devices such as printers in many different locations.

Printers/multifunction-devices designed for use in a network environment routinely offer greater functionality than a simple desktop printer such as the printer can be managed, monitored, and configured directly from a standard web browser or any web-enabled application. Examples of network connected devices may include scanners, readers, fax machines, label makers, multifunction devices (MFD), or servers. When a user wishes to use one of the networked devices, a connection program may present the user with a list of all networked devices (such as printers) based on selection criteria provided by the user.

However, a mobile device may not be properly enabled to connect to a network device. One issue is that printers and mobile devices often reside on different networks. For instance, a mobile device can only print to a network printer when the mobile device and the printer are on the same network. There are many situations in which users may not know the identity of a network of the selected device and/or how to connect to the network in order to connect to the device and perform tasks. For example, a user may want to use a multifunction device via their mobile, over an enterprise WiFi network. However, there may be more than one network service set identifiers (SSIDs) visible to the user, and the user may not know which one to use in order to gain access to the selected device. Hence, ensuring that mobile devices have access to network devices and can find network devices on a local area network, particularly a local area network that includes several subnets and may include one or more wireless networks is difficult. Existing pairing solutions involving the use of NFC hotspots, passive NFC tags, Bluetooth Low Energy (BLE) tags or transmitters and so on are well-known, but do not solve this problem. Instead, such pairing solutions merely solve the problem of identifying the network address (IP or hostname) of the specific device in order to communicate with it, and do not address the problem of how one should connect to the surrounding enterprise network in order to be able to reach that specific device. Moreover, existing solutions increase administrative overhead in setting up information required for establishing connections, especially as it may change over time. The above problems may be exacerbated for network devices that are hard wired to a network and as such do not know the network topology of the network and/or the wireless network information.

The current disclosure discloses a system and method to automatically identify a network to use for connecting to a network device using historical data mining, and determine the network parameters for the identified network to establish a connection between a mobile device and the network device.

SUMMARY

In an embodiment, a system for automatically establishing a network connection between a mobile device and a target network device may include a first mobile device and a computer-readable storage medium. The computer-readable storage medium may include one or more programming instructions that, when executed, cause the processor to receive a selection of a target network device and determine whether the first mobile device has previously established one or more network connections with the target network device. The received selection may include identification information corresponding to the target network device. If the first mobile device has previously established one or more network connections with the target network device, the system may retrieve information corresponding to the one or more previously established network connections and determine whether the first mobile device and the target network device can connect using information corresponding to one of the previously established network connections, and if the first mobile device and the target network device can connect using information corresponding to one of the previously established network connections, the system may use a transmitter component of the first mobile device to connect the first mobile device and the target network device using information corresponding to that previously established network connection. However, if the first mobile device has not previously established one or more network connections with the target network device and/or if the first mobile device and the target network device cannot connect using information corresponding to one of the previously established network connections, the system may access a connection server to determine whether one or more records of network connections corresponding to the target network device exist, wherein each of the one or more records comprise information associated with a network connection between the target network device and one of a plurality of other mobile devices associated with users of the connection server. If one or more records of network connections corresponding to the target network device exist, the system may retrieve information included in each of the one or more records from the connection server to determine whether the first mobile device and the target network device can connect using information included in one of the one or more records. If the first mobile device and the target network device can connect using information included in one of the one or more records, the system may the use the transmitter component of the first mobile device to establish a new network connection between the first mobile device and the target network device using information included in that record.

In an embodiment, an example the target network device may be a print device; and the system may send a communication including a print document for printing to the print device, via the established network connection.

In an embodiment, receiving a selection of the target network device may include receiving an identification of the target network device from a user, recognizing the target network device as being proximate to the mobile device, and/or receiving a selection of a desired service from a user.

In various embodiments, the system may store information relating to the established connection in a connection history data file corresponding to the first mobile device after connecting the first mobile device and the target network device using information corresponding to that previously established network connection. In an embodiment, determining whether the first mobile device has previously established one or more network connections with the target network device may include accessing the connection history data file, and searching the connection history data file for one or more previously established connections using the identification information corresponding to the target network device.

Optionally, the system may store information relating to the established connection in a data store of the connection server after connecting the first mobile device and the target network device using information included in that record.

In an embodiment, determining whether the first mobile device and the target network device can connect using information corresponding to one of the previously established network connections may include identifying a network used for establishing each of the one or more previously established network connections, using a rule set to create a prioritized list of networks, and attempting to connect the first mobile device and the target network device using each identified network in the prioritized list of networks iteratively starting with a highest priority network. The prioritized list of networks may include the identified networks ordered based on priority. If the first mobile device and the target network device can successfully connect using an identified network in the prioritized list, the system may then determine that the first mobile device and the target network device can connect using information corresponding to one of the previously established network connections such that the identified network is associated with that previously established network connection. In an embodiment, the system may use the identified network to connect the first mobile device and the target network device. An example rule set may include rules for creating the prioritized list of networks using one or more of the following criteria: using signal strength of a network to assign priority, wherein a network that has a higher signal strength is assigned a higher priority compare to a network that has a lower signal strength, assigning a higher priority to a network to which the first mobile device is currently connected, using security level of a network to assign priority, wherein a more secure network is assigned a higher priority to a network compared to a lesser secure network, determining whether network access credentials for a network to assign priority, wherein a network for which network access credentials are available is assigned a higher priority compared to a network for which network access credentials are not available, decreasing priority assigned to a network in proportion to the number of failed attempts to connect to the target network device using that network, and increasing priority assigned to a network in proportion to the number of failed attempts to connect to the target network device using that network.

In various embodiments, determining whether the first mobile device and the target network device can connect using information included in one of the one or more records may include identifying a network in each of the one or more record, using a rule set to create a prioritized list of networks, and attempting to connect the first mobile device and the target network device using each identified network in the prioritized list of networks iteratively starting with a highest priority network. An identified network is a network used for establishing the network connection corresponding to that record. The prioritized list may include the identified networks ordered based on priority. The system may determine that the first mobile device and the target network device can connect using information included in one of the one or more records if the first mobile device and the target network device can successfully connect using an identified network in the prioritized list. In an embodiment, the system may use the identified network of that record to connect the first mobile device and the target network device. An example rule set may include rules for creating the prioritized list of networks using one or more of the following criteria: using signal strength of a network to assign priority, wherein a network that has a higher signal strength is assigned a higher priority compare to a network that has a lower signal strength, assigning a higher priority to a network to which the first mobile device is currently connected, removing a network that is unavailable for use by the first mobile device from the prioritized list of networks, using security level of a network to assign priority, wherein a more secure network is assigned a higher priority to a network compared to a lesser secure network, determining whether network access credentials for a network to assign priority, wherein a network for which network access credentials are available is assigned a higher priority compared to a network for which network access credentials are not available, decreasing priority assigned to a network in proportion to the number of failed attempts to connect to the target network device using that network, increasing priority assigned to a network in proportion to the number of failed attempts to connect to the target network device using that network, using user feedback relating to a network to assign priority, and using performance data relating to a network to assign priority.

In an embodiment, if the first mobile device and the target network device cannot connect using information included in one of the one or more records, the system may use a rule set to create a prioritized list of available networks, and determine whether the first mobile device and the target network device can connect using a network in the prioritized list of available networks by attempting to connect the first mobile device and the target network device using each network in the prioritized list of available networks iteratively starting with a highest priority network. A prioritized list of available networks may include a list of networks available to the mobile device ordered based on priority wherein the determining comprises. The system may use the transmitter component of the first mobile device to establish a new network connection between the mobile device and the target network device using that network if the first mobile device and the target network device can connect using a network in the prioritized list of available networks. The system may also store information corresponding to that network and the established network connection.

Optionally, if the first mobile device and the target network device cannot connect using a network in the prioritized list of available networks, the system may prompt a user of the mobile device to identify a network and associated network parameters for establishing a new network connection between the first mobile device and the network device.

DETAILED DESCRIPTION

Figure 1:
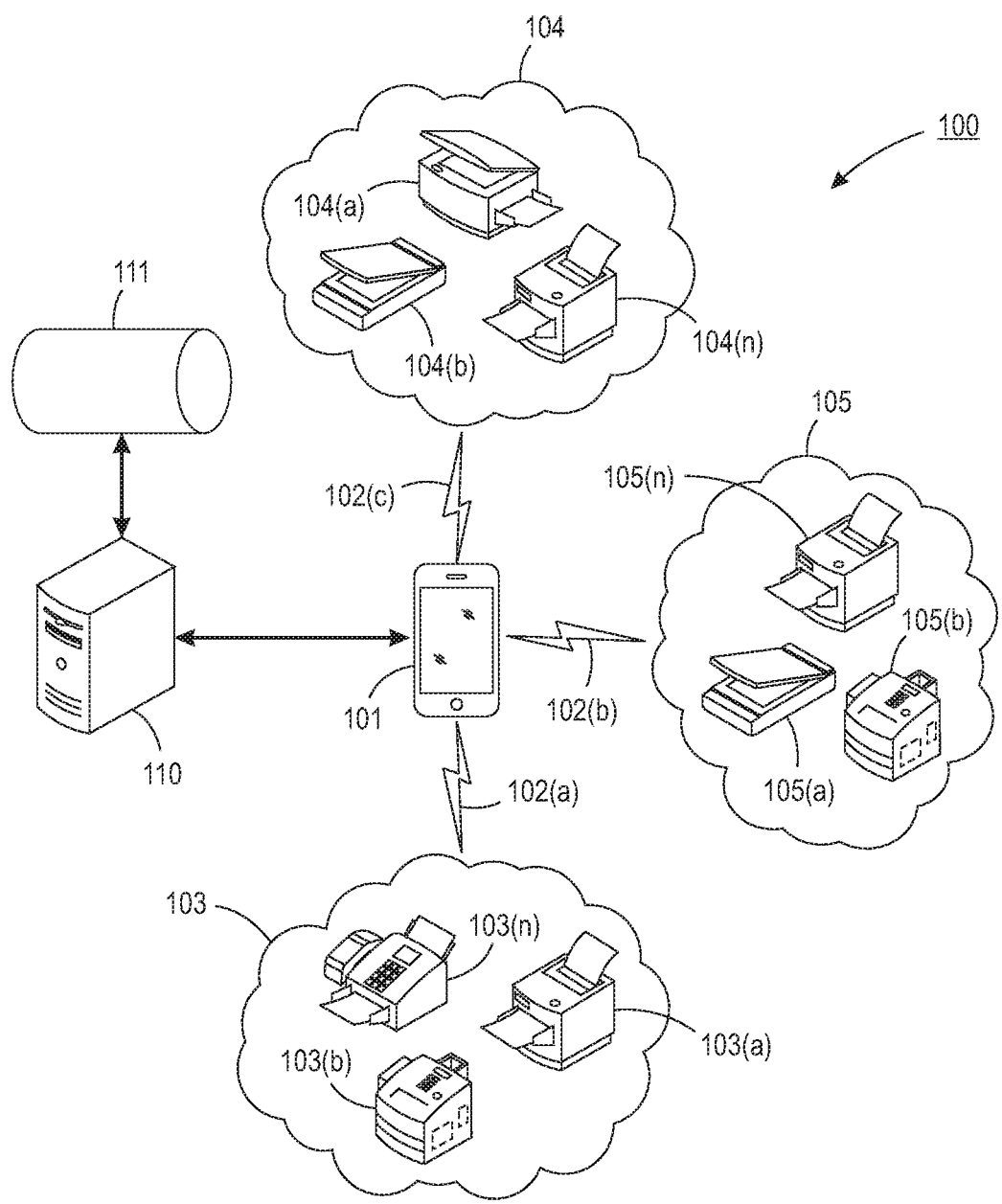
FIG. 1 is a schematic illustration of a system for automatically identifying a network and associated network access parameters to use for establishing a connection between a network device and a mobile device, according to an embodiment.

This disclosure is not limited to the particular systems, methodologies or protocols described, as these may vary. The terminology used in this description is for the purpose of describing the example versions or embodiments, and is not intended to limit the scope.

As used in this document, any word in singular form, along with the singular forms "a," "an" and "the," include the plural reference unless the context clearly dictates otherwise. Unless defined otherwise, all technical and scientific terms used in this document have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used in this document, the term "comprising" means "including, but not limited to."

A "mobile device" or "mobile electronic device" refers to a portable computing device that includes a processor and non-transitory, computer-readable memory. The memory may contain programming instructions in the form of a software application that, when executed by the processor, causes the device to perform one or more network access parameter identifying operations. Examples of suitable portable electronic devices include smartphones, personal digital assistants, cameras, tablet devices, electronic readers, personal computers, media players, satellite navigation devices and the like. In an embodiment, a mobile device may also include, one or more communication components or interfaces such as, without limitation, wireless transmitter/receiver, short range communications interface, or the like.

A "print device" refers to a device that includes a print engine for printing a document. The print device may also include a processor that can process the document and a memory unit for storage of the documents or portions of the document. Any suitable print device can be used including, but not limited to, inkjet and laser print devices and multifunction devices.

A "network" is a group of two or more computer systems or electronic devices communicatively linked together for purposes of sharing data and resources, wherein each network is identified by a service set identifier (SSID). The connection between computer systems can be done via cabling, such as Ethernet cable, or wirelessly through wireless communication signals. Connected computers can share resources, like access to the Internet, printers, file servers, and others, as well as information in the form of data. Examples may include, without limitation, a local area network (LAN) such as WiFi network, Bluetooth network, etc.; a wide area network (WAN) such as internet and intranet; a virtual private network (VPN); and other such networks. Furthermore, a network may include various interconnected networks. For example, a network may include one or more interlinked networks within an entity, such as a corporation, educational institution, governmental institution or department.

A "network device" refers to an electronic device which is communicatively coupled with one or more other devices via one or more communication links, and may provide one or more services such as document processing functions (e.g., printing, copying, facsimile transmitting or receiving, scanning, or performing other actions on document-based data). Examples may include, without limitation, a print device, a scanner, a fax, a multifunction device (MFD), a copier, or the like. The term "network resource" refers to any type of network resource. Example network resources include, without limitation, a network device or element, a server, a Web server, and any type of network service.

Use of the terms "coupled" and "connected", along with their derivatives, may be used to indicate that two or more elements (such as mobile devices, network devices, etc.) are in either direct or indirect (possibly with other intervening elements between them) physical, communicative, or electrical contact with each other, and/or that the two or more elements co-operate or interact with each other. Establishing a connection means establishing a paired communication link whereby the devices recognize each other and transmit information to each other.

FIG. 1 is a block diagram illustrating a system 100 for automatically identifying a network and associated network parameters to be used for establishing a connection between a mobile device 101 and a network device, in accordance with the principles of the current disclosure. FIG. 1 shows a plurality of networks (103, 104, 105, and so on) where each of the plurality of networks may include one or more network devices (103(*a*), 103(*b*), . . . 103(*n*); 104(*a*), 104(*b*), . . . 104(*n*); and 105(*a*), 105(*b*), . . . 105(*n*)). Examples of network devices may include, without limitation, fax device 103(*n*), multifunction device 103(*b*), copier 104(*a*), scanner 104(*b*), and print device 103(*a*). In an embodiment, the mobile device 101 may establish communication links 102(*a*), 102(*b*), and/or 102(*c*) with each of the plurality of networks 103, 104, 105 respectively, to access one or more network devices on the corresponding network. Examples of the communication link may include, without limitation, a direct wireless communications link (such as Wi-Fi, a wireless communications link with a wireless access point connected to a wired network, a short-range communications link, or a communications link established via a gateway), or a wired link such as Ethernet or fiber optic connection. It should be understood to those skilled in the art that the mobile device 101 may establish more than one communication link with a network and/or a network device.

Each network may have an associated network profile. The network profile may include one or more network parameters, for example, an SSID or other identifier of the network, configuration parameters, security credentials and settings, authentication information, authentication protocol proxy settings and information, firewall, access rules and/or restrictions, network protocol parameters, or the like. As discussed previously, in the embodiments of this document, a mobile device user need not know which network to use (amongst the plurality of networks) and/or the associated network parameters when a user wishes to connect to a network device.

One or more of the network devices may include a user interface (not shown here), which may be employed to select features of, and enter other data to, a network device. Such a user interface may include, for example, a touch screen having touch activated keys for navigating through an option menu, a keypad, an audio interface, or the like. In certain embodiments, the network device may also include means for user authentication. The network device, for example, may be connected to an external user authentication system, such as a smart card reader, or may be configured to include internal user identification.

One or more of the network devices may also include Bluetooth™, near-field communication (NFC), or other short-range communications hardware components (in addition to and different from, any other network connection communication components that the device may have) that allows for contactless communication between devices that are located very close to one another. In certain embodiments, a short-range communications link established with a network device may also be configured to cause the mobile device to perform certain processing actions, such as launching of applications, navigating to a particular website, or downloading of a particular file. Short-range communications require close proximity (e.g., no more than a few inches, or in some cases no more than one or two feet) to establish a communications link, and hence the operation of establishing a link with another device may be referred to as a "tap." The term "tap" as used herein does not necessarily refer to physical contact between communicating devices, but rather positioning the devices in sufficiently close proximity to establish a communications link. For example, a user of an NFC or Bluetooth enabled smart phone may tap an NFC or Bluetooth tag to send and/or receive data from the tag. For simplicity, in the document, the term "short range communication" or NFC may interchangeably refer to either a short range communication protocol or an NFC protocol.

In an embodiment, the mobile device 101 may also be in communication with a connection server 110 and one or more data stores 111. In an embodiment, one or more of the data stores may be a part of the connection server 110. The connection server may be implemented as a web server, a server on a private network or local intranet, or other local or remote hardware, software, or logic. The connection server may receive and store network profiles including network parameters associated with one or more networks. The connection server may also receive and store information relating to one or more network devices, such as without limitation network device identification information, identification of one or more networks and/or communication links for establishing a connection with a network device, access rules and/or restrictions associated with the network device, services provided by a network device, or the like.

The connection server may allow a set of users (e.g., users authorized to use and/or access the connection server) to automatically connect to a network device and/or use the device's offered services by identifying the appropriate network and associated network parameters to use for establishing a connection using historical data. In an embodiment, a user's mobile device may communication with the connection server via a mobile application (such as the network application discussed below). For example, a mobile device may automatically be granted access to the communication server upon launching the network application. Alternatively and/or additionally, a connection server may authenticate a user using access credentials distinct from that of the network application. In an embodiment, connection server may also store data and associated metadata associated with its users (and/or users' associated mobile device). Alternatively and/or additionally, the connection server may be configured to access and/or retrieve data and metadata associated with a network, network device and/or a user from a remote server. In an embodiment, the connection server may also store information relating to connections established between network devices and mobile devices, as well as information relating to attempts for establishing connections between network devices and mobile devices (discussed below).

In this document, the terms "network application" refers to a software application that is configured to cause an electronic device to perform some or all of the functions that are described in this disclosure. The mobile device may have a network application pre-configured on the mobile device. Alternatively and/or additionally, the user of a mobile device may download and install a network application onto the mobile device. The user may acquire the application by downloading it from an application store or from a network providers, service providers, or the like. In certain embodiments, the network application may be pre-installed on the mobile device. The network application may include virtually any application type which may run on any underlying operating system or platform. The installed network application may register itself with the mobile operating system allowing the application to monitor certain activities on the mobile operating system, and using the functionalities of the operating system. The network application operates to automatically identify a network and associated network parameters and connect the mobile device to a network device, via the identified network, as discussed later.

The network application may correspond to a local application which executes on the mobile device. Alternatively, the network application may represent a web application which executes on a remote application server. That is, the network application may include any application functionality which is accessed by the user over a network and experienced locally as application e.g., using a browser running on the mobile device. The network application may include or have access to one or more data sores such as, without limitation, a connection server. In certain embodiments, the database may be exported to another local device or to a cloud-based repository. Techniques for executing such a web application, and related technology, are well known in the art and are therefore not described further in detail herein, except as may be helpful or necessary to understand operations of the system. In an embodiment, use of the network application and/or access to one or more data stores may be restricted using access level restrictions, using access credential verification (such as username and password), or the like.

Figure 2:
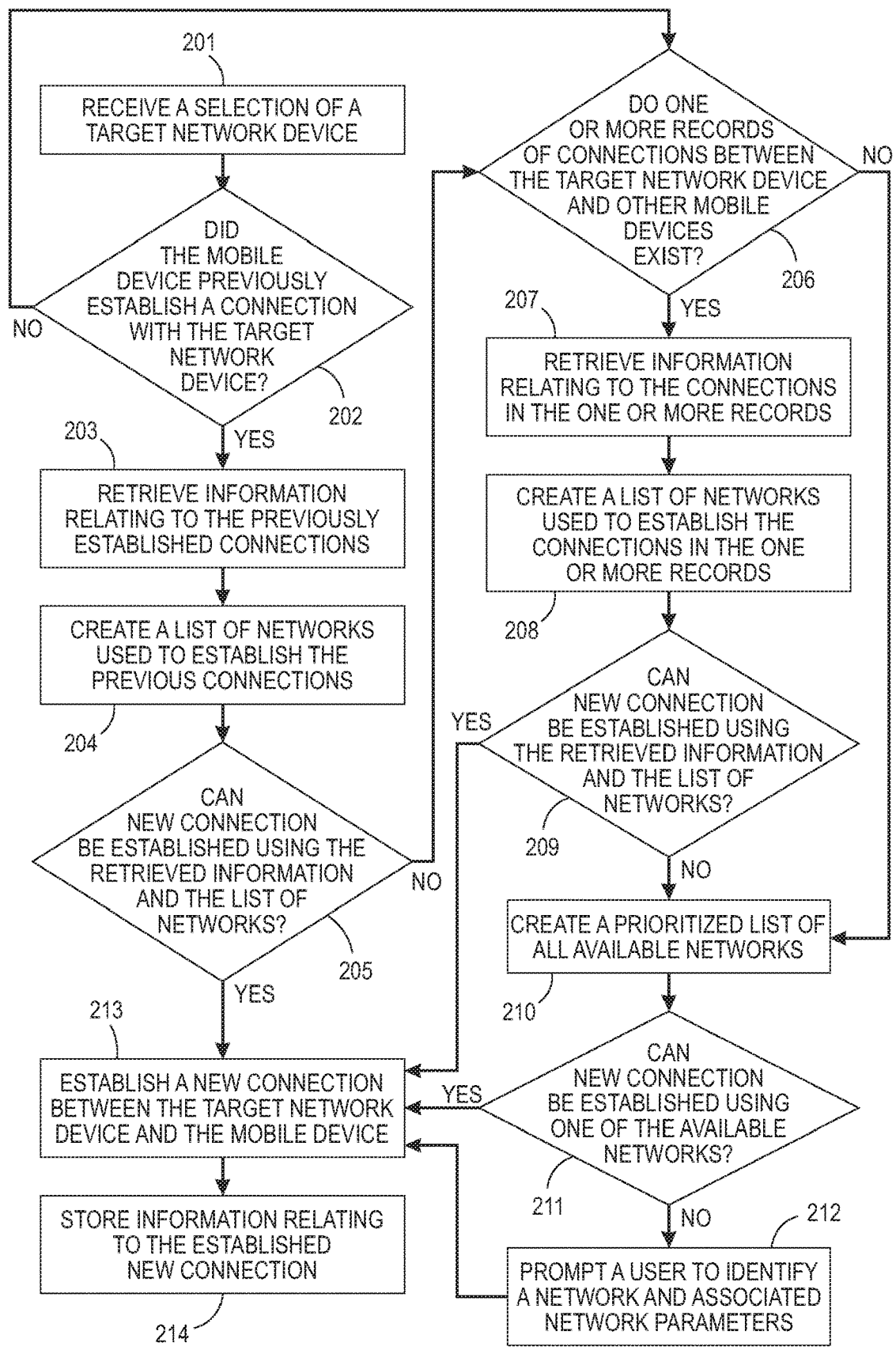
FIG. 2 depicts a flow chart example for automatically identifying a network and associated network access parameters to use for establishing a connection between a network device and a mobile device using historical data, according to an embodiment.

FIG. 2 depicts a flow chart example of a process for automatically identifying a suitable network and associated network parameters for connecting to a network device and establishing a connection between the network device and a mobile device, according to an embodiment.

In step 201, a network application on a mobile device may receive a selection of a target network device that a user of the mobile device desires to connect to. There may be one or more scenarios under which the network application may receive a selection of a target network device. In an embodiment, the user may provide a selection of a target network device to the network application by providing identification information corresponding to the target network device. Examples of such identification information may include, without limitation, device name, network address of the target network device (e.g., Bluetooth® address, IP address, MAC address, or the like), network device make and/or model, network device location, etc. or a combination thereof.

Alternatively and/or additionally, a network application may receive a selection of a target network device when the target network device is recognized as being proximate to the mobile device (i.e., when the network device is within a detection range of the device's network short-range communication elements). For example, a user may provide a selection of a target network device by bringing an NFC enabled mobile device within a communication range of an NFC tag attached to and/or incorporated within the network device (i.e., tap as discussed previously), and the NFC enabled mobile device may respond to a field generated by a NFC enabled print device. While the current example relies on NFC to establish the initial connection between a mobile device and a target network device, it will be apparent to those skilled in the art that other short-range wireless communication protocols may also be used in accordance with the principles of the current disclosure. In another embodiment, the network application may receive a selection of a network device when the mobile device scans a QR or other matrix code or bar code, reads an RFID tag, or the like associated with the target network device. The network application may also retrieve identification information corresponding to the target network device using the short-range communications link, and/or from the matrix or bar code, RFID tag, or the like associated with the target network device.

In an alternate embodiment, a user may identify a desired service (such as printing) and the network application may provide a list of one or more network devices that provide the desired service, and it may display the list or present it via an audio output of the mobile device. The user may then use a user interface of the mobile device select a target network device from the list. The network application may receive the list of one or more network devices that provide the desired services from a connection server that stores or has access to information relating to one or more network devices (as discussed above). For example, the connection server may store information relating to previous connections established between network devices and one or more mobile devices of users of the communication server, and/or one or more services provided to users of the communication server. In an embodiment, the connection server may only include a subset of the network devices that provide the desired service in the list provided to the network application based on, for example, the mobile device location, user identity, or the like. In an embodiment, the network application may also retrieve identification information corresponding to the target network device from the connection server.

In another embodiment, the network application may provide to the user a list of all available network devices and their respective services (for example, based on location, current network of the mobile device, user identity, or the like), and receive a selection of the target network device from the user. For example, if a user's mobile device is connected to an enterprise network, the network application may provide a list of all network devices on one or more enterprise networks available for use by the user based on location, user access level, or the like.

Upon receipt of a selection of a target network device, the network application may determine 202 if the mobile device has previously established a connection with the target network device at least once. In an embodiment, every time a connection is established between the mobile device and a network device, the network application may store information relating to the connection established in a connection history data file associated with the mobile device. In an embodiment, the network application may store the connection history data file in, for example, a database associated with a connection server, locally, and/or other databases. As such, the network application may store and/or have access to a connection history data file for a mobile device that includes information regarding past connections between the mobile device and various network devices. In an embodiment, the network application may search and/or parse the connection history data file to determine if the mobile device has previously established a connection with the target network device to search for the target network device identification information, such as the network address, using techniques known to those skilled in the art. Alternatively, the network application may search and/or parse the complete connection history data file and/or a subset of the connection history data file corresponding to a defined period of time to determine if the mobile device has previously established a connection with the target network device.

In an embodiment, if the network application determines that the mobile the mobile device has previously established a connection with the target network device at least once (202: YES), the network application may retrieve 203 information relating to the previously established connections from the connection history data file, and use the information to create 204 a list of one or more networks used to establish the previous connections. In an embodiment, the information relating to the previously established connections may include, without limitation, network device information and settings used for establishing the previous connection with the network device via a network, network identification and other network parameters relating to the network used for establishing the previous connection, any errors associated with the previously established connection, services provided by the target network device, or the like. In an embodiment, network device information and settings relating to the previously established connections may include, without limitation, an identifier for the network device such as a device name, the network address of the network device (e.g., Bluetooth® address, IP address, MAC address, or the like), the default gateway, port information, and/or one or more Domain Name Server (DNS) addresses.

The network application may then determine 205 if a new connection can be established between the mobile device and the network device using the information relating to the previously established connections and the list of one or more networks. In an embodiment, the network application may first prioritize the list of one or more networks using a rule set to create an ordered list. Example rule sets may include prioritizing networks to which the mobile device is already connected; creating an ordered list of networks using one or more of the following criteria: signal strength, network security parameters, previous logs of failed attempts to connect to a target network device using a network, availability of network access credentials, or the like. For example, a network with a higher signal strength may be given higher priority compared to a network with a lower signal strength. Similarly, a network with a higher security level may be given higher priority compared to a network with a lower security level. Networks for which access credentials are known may be given higher priority compared to those for which access credentials are not know. If logs relating to failed attempts to connect to a target network device using a network exist, priority of that network may be lowered proportionate to the number of such failed attempts. Alternatively, priority associated with a network may be increased based on the number of successfully established connections between the mobile device and the target network device using that network. In an embodiment, one or more of the above criteria may be given different weights. In order to determine whether a new connection can be established between the mobile device and the network device using the information relating to the previously established connections and the list of one or more networks, the network application may then attempt to establish a new connection between the mobile device and the network device iteratively using the networks on the list in their priority order starting with the highest priority network till a connection is established. The network application may retrieve network parameters for each network from the information relating to a previously established connection that used the above network for establishing the connection.

If the network application determines that a connection can be established (205: YES) with the target network device using the information relating to the previously established connection, the network application may establish 213 a connection between the target network deice and the mobile device. The network application may also store 214 information relating to the established new connection in, for example, the connection history data file. Such information include information relating to the new connection such as network SSID and other network parameters relating to the network, and network device settings used to establish the connection. The network application may also store information relating to any failed attempts to establish a connection between the mobile device and the target network device using one or more networks of the list in the connection history data file.

If a connection cannot be establish with the network device (205: NO), using information relating to the previously established connections and/or if the mobile device has not previously established a connection with the target network device (202: NO), the network application may query a connection server to determine 206 if one or more records relating to connections established between the target network device and other mobile devices exist. As discussed above, a connection server includes and/or has access to a data store that includes information relating to previous connections established between network devices and mobile devices of users of the communication server and/or information relating to one or more services provided by network devices to users of the communication server.

If the system determines that one or more records relating to connections established between a target network device and other mobile devices exist (206: YES), the system may retrieve information 207 relating to the connections, and use the information to create 208 a list of one or more networks used to establish the connections. In an embodiment, the information relating to the previously established connections may include, without limitation, network device information and settings used for establishing the previous connection with the network device via a network, network identification and other network parameters relating to the network used for establishing the previous connection, any errors associated with the previously established connection, services provided by the target network device, or the like (as discussed above with respect to previously established connections).

The network application may then determine 209 if a connection can be established between the mobile device and the target network device using the information relating to the connections and the list of one or more networks. In an embodiment, the network application may first prioritize the list of one or more networks using a rule set to create an ordered list. Example rule sets may include prioritizing the list using one or more of the following criteria: network availability, user access credentials (i.e., whether or not a user of the mobile device is allowed to connect to a network), signal strength, network security parameters, cumulative success rate of connecting to the a target network device using a network, time since a connection was successfully established with a target network device using a network, previous logs of failed attempts to connect to a target network device using a network, availability of network access credentials, user feedback regarding the use and/access of network, performance data relating to a network, or the like. For example, a network with a higher signal strength may be given higher priority compared to a network with a lower signal strength. Similarly, a network with a higher security level may be given higher priority compared to a network with a lower security level. Networks for which access credentials are known may be given higher priority compared to those for which access credentials are not know. If logs relating to failed attempts to connect to a target network device using a network exist, priority of that network may be lowered proportionate to the number of such failed attempts. Alternatively, priority associated with a network may be increased based on the number of successfully established connections between with the target network device using that network. Similarly priority assigned to a network may be inversely proportional to the elapsed time since the last successful connection established with the target device using that network. Networks that are currently unavailable to the user's mobile device may be assigned a low priority and/or removed from the list. In an embodiment, one or more of the above criteria may be given different weights during prioritization of the list. In order to determine whether a connection between the mobile device and the target network device can be established using the information relating to the connections and the list of one or more networks, the network application may then attempt to establish a connection between the mobile device and the network device iteratively using one or more networks on the list in their priority order starting with the highest priority network till a connection is established. The network application may retrieve network parameters for each network from the information relating to a connection that used the above network for establishing the connection.

If it is determined that a connection can be established (209: YES) with the target network device using the information relating to the previously established connection, the network application may establish 213 a connection between the target network deice and the mobile device using the information relating to the previously established connection. The network application may also store 214 information relating to the established connection in, for example, the data store of the connection server. Such information may include information relating to the new connection such as network SSID and other network parameters relating to the network, and network device settings used to establish the connection. The network application may also store information relating to any failed attempts to establish a connection between the mobile device and the target network device using one or more networks of the list.

If a connection cannot be establish with the network device (209: NO), using information relating to the connections and/or if no records relating to connections established between a target network device and other mobile devices exist (206: NO), the network application may create 210 a prioritized list of all available networks to which the mobile device is allowed to connect. In an embodiment, the network application may prioritize the list of one or more available networks using a rule set. Example rule sets may include prioritizing the list of networks using one or more of the following criteria: user access credentials (i.e., whether or not a user of the mobile device is allowed to connect to a network), signal strength, network security parameters, previous logs of failed attempts to connect to a target network device using a network, availability of network access credentials, performance data relating to a network, or the like. The network application may then determine 211 if a connection between mobile device and the target network device can be established using one of the available networks. In order to determine whether a connection between mobile device and the target network device can be established using one of the available networks, the network application may attempt to establish a connection between the mobile device and the network device iteratively using one or more networks on the list in their priority order starting with the highest priority network till a connection is established. In an embodiment, the network application may use information stored in the data store corresponding to the target network device and/or the connection history data file corresponding to the mobile device to retrieve information such as network access credentials relating to the available networks. Alternatively and/or additionally, the network application may prompt a user of the mobile device provide information such as network access credentials relating to the available networks.

If it is determined that a connection can be established (211: YES) with the target network device using one of the available networks, the network application may establish 213 a connection between the target network deice and the mobile device. The network application may also store 214 information relating to the established new connection in, for example, the connection history data file or a data store of the connection server. Such information may include information relating to the new connection such as network SSID and other network parameters (e.g., authentication protocol, proxy settings, security settings, or other similar information) relating to the network used to establish the connection. The network application may also store information relating to any failed attempts to establish a connection between the mobile device and the target network device using one or more of the available networks.

If a connection cannot be established with the target network device (211: NO) using one of the available networks, the network application may prompt 212 a user of the mobile device to manually identify a network to connect to the target network device and provide the network parameters. Alternatively, the network application may send a query to a user of the connection server who may have successfully established a connection with the target network device in the past to manually identify a network to use for connection to the target network device and provide the network parameters.

A connection is then established 213 between the mobile device and the target network device using the network identification and parameters provided by the user of the mobile device. The network application may store 214 the received network identity and parameters in association with the target network for future use, in for example the connection history data file and/or a data store of the connection server. The network application may use the network device identifying information to associate the network identity and parameters with the target network device. For example, in an embodiment, the network application may use the network address of the target network device to associate the target network device with the network and network parameters. In an embodiment, the network application may store the above information in, for example, a metadata server.

In this disclosure, the process of establishing a connection between a mobile device and a target network device may include causing a wireless transmitter component of the mobile device to connect to the network device via the identified network using the identified network parameters and other information.

In an embodiment, the above described process may be used to update the network profile (identity and associated parameters) for a network every time a user successfully establishes a connection between a mobile device and a network device using the network, and/or if a user fails to establish connection between a mobile device and a network device using the network.

Once a connection is established between the mobile device and the network device, the network device may provide one or more services (such as printing) to the mobile device via the established network connection. For example, the mobile device may transmit information such as documents to be printed to a network device using the established connection. However, it should be noted that in this document a connection is established between a mobile device and a network device if the network device is reachable through the connection, even if the mobile device denied access to a service provided by the network device.

Figure 3:
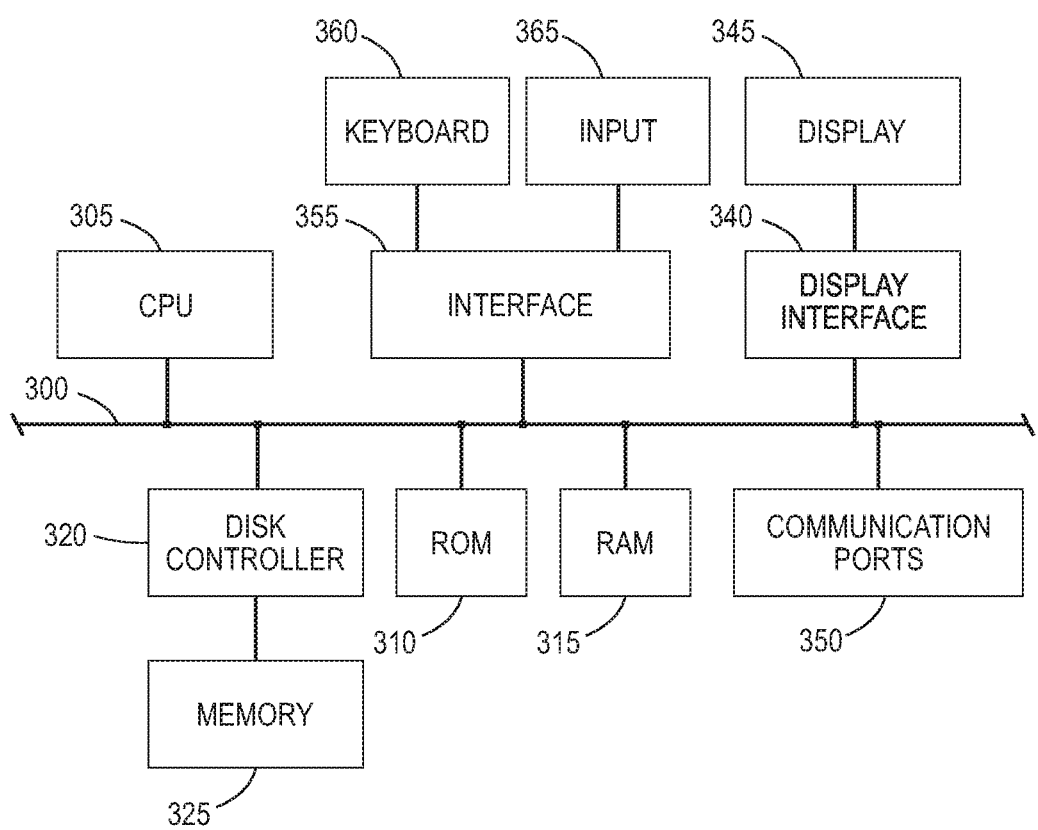
FIG. 3 depicts various embodiments of a mobile device for using the systems and processes described in this document.

The network access discovery method and process as described above may be performed and implemented by an operator of a mobile electronic device and/or a network device having a processor and a communications interface. FIG. 3 depicts an example of internal hardware that may be used to contain or implement the various computer processes and systems as discussed above. For example, the mobile electronic device discussed above may include hardware such as that illustrated in FIG. 3. An electrical bus 300 serves as an information highway interconnecting the other illustrated components of the hardware. CPU 305 is a central processing unit of the system, performing calculations and logic operations required to execute a program. CPU 305, alone or in conjunction with one or more of the other elements, is a processing device, computing device or processor as such terms are used within this disclosure. A CPU or "processor" is a component of an electronic device that executes programming instructions. The term "processor" may refer to either a single processor or to multiple processors that together implement various steps of a process. Unless the context specifically states that a single processor is required or that multiple processors are required, the term "processor" includes both the singular and plural embodiments. Read only memory (ROM) 310 and random access memory (RAM) 315 constitute examples of memory devices. The terms "data store," "computer-readable memory," "memory device" and similar terms include single device embodiments, multiple devices that together store programming or data, or individual sectors of such devices.

A controller 320 interfaces with one or more optional memory devices 325 that service as date storage facilities to the system bus 300. These memory devices 325 may include, for example, an external or internal disk drive, a hard drive, flash memory, a USB drive or another type of device that serves as a data storage facility. As indicated previously, these various drives and controllers are optional devices. Additionally, the memory devices 325 may be configured to include individual files for storing any software modules or instructions, auxiliary data, incident data, common files for storing groups of contingency tables and/or regression models, and/or one or more databases for storing the information as discussed above.

Program instructions, software or interactive modules for performing any of the functional steps associated with the processes as described above may be stored in the ROM 310 and/or the RAM 315. Optionally, the program instructions may be stored on a non-transitory, computer readable medium such as a compact disk, a digital disk, flash memory, a memory card, a USB drive, an optical disc storage medium, and/or other recording medium.

An optional display interface 340 may permit information from the bus 300 to be displayed on the display 345 in audio, visual, graphic or alphanumeric format. Communication with external devices may occur using various communication components such as an antenna, transmitter component and/or receiver 350. A communication port 350 may be attached to a communications network, such as the Internet, a WiFi network, a local area network or a cellular telephone data network.

The hardware may also include an interface 355 which allows for receipt of data from input devices such as an imaging sensor 360 of a scanner or other input device 365 such as a keyboard, a mouse, a joystick, a touchscreen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method for automatically establishing a network connection between a mobile device and a target network device comprising:
by a processor, executing a network application on a first mobile device that causes the processor to:
receive a selection of a target network device, wherein the selection comprises identification information corresponding to the target network device,
determine whether the first mobile device has previously established one or more network connections with the target network device,
if the first mobile device has previously established one or more network connections with the target network device:
retrieve information corresponding to the one or more previously established network connections, wherein the retrieved information comprises, for each of the previously established network connections, an identification of a network used for establishing that network connection,
determine whether the first mobile device and the target network device can connect using information corresponding to one of the previously established network connections and using a network identified for establishing that previously established network connection, and
if the first mobile device and the target network device can connect using information corresponding to one of the previously established network connections, use a transmitter component of the first mobile device to connect the first mobile device and the target network device using information corresponding to that previously established network connection using the network identified for establishing that previously established network connection, and
if the first mobile device has not previously established one or more network connections with the target network device:
access a connection server to determine whether one or more records of network connections corresponding to the target network device exist, wherein each of the one or more records comprise information associated with a network connection between the target network device and one of a plurality of other mobile devices associated with users of the connection server, and
if one or more records of network connections corresponding to the target network device exist:
retrieve, from the connection server, information included in each of the one or more records,
determine whether the first mobile device and the target network device can connect using information included in one of the one or more records, and
if the first mobile device and the target network device can connect using information included in one of the one or more records, use the transmitter component of the first mobile device to establish a new network connection between the first mobile device and the target network device using information included in that record.

2. The method of claim 1, wherein:
the target network device is a print device; and
executing the network application on the first mobile device further causes the processor to send a communication comprising a print document for printing to the print device, via the established network connection.

3. The method of claim 1, further comprising causing the processor to after connecting the first mobile device and the target network device using information corresponding to that previously established network connection, store in the connection history data file corresponding to the first mobile device, information relating to the established connection.

4. The method of claim 1, further comprising causing the processor to after connecting the first mobile device and the target network device using information included in that record, store in a data store of the connection server information relating to the established connection.

5. The method of claim 1, wherein causing the processor to determine whether the first mobile device and the target network device can connect using information corresponding to one of the previously established network connections comprises:
using a rule set to create a prioritized list of networks, wherein the prioritized list of networks comprises the identified networks ordered based on priority;
attempting to connect the first mobile device and the target network device using each identified network in the prioritized list of networks iteratively starting with a highest priority network; and
if the first mobile device and the target network device can successfully connect using an identified network in the prioritized list, determining that the first mobile device and the target network device can connect using information corresponding to one of the previously established network connections, wherein the identified network is associated with that previously established network connection.

6. The method of claim 5, wherein causing the processor to use the transmitter component of the first mobile device to connect the first mobile device and the target network device using information corresponding to that previously established network connection comprises using the identified network to connect the first mobile device and the target network device.

7. The method of claim 5, wherein the rule set comprises rules for creating the prioritized list of networks using one or more of the following criteria:
   using signal strength of a network to assign priority, wherein a network that has a higher signal strength is assigned a higher priority compare to a network that has a lower signal strength;
   assigning a higher priority to a network to which the first mobile device is currently connected;
   using security level of a network to assign priority, wherein a more secure network is assigned a higher priority to a network compared to a lesser secure network;
   determining whether network access credentials for a network to assign priority, wherein a network for which network access credentials are available is assigned a higher priority compared to a network for which network access credentials are not available;
   decreasing priority assigned to a network in proportion to the number of failed attempts to connect to the target network device using that network; or
   increasing priority assigned to a network in proportion to the number of failed attempts to connect to the target network device using that network.

8. The method of claim 1, wherein causing the processor to determine whether the first mobile device and the target network device can connect using information included in one of the one or more records:
   identifying a network in each of the one or more records, wherein the identified network is used for establishing the network connection corresponding to that record;
   using a rule set to create a prioritized list of networks, wherein the prioritized list comprises the identified networks ordered based on priority;
   attempting to connect the first mobile device and the target network device using each identified network in the prioritized list of networks iteratively starting with a highest priority network; and
   if the first mobile device and the target network device can successfully connect using an identified network in the prioritized list, determining that the first mobile device and the target network device can connect using information included in one of the one or more records, wherein the identified network is associated with that record.

9. The method of claim 8, wherein causing the processor to use the transmitter component of the first mobile device to connect the first mobile device and the target network device using information included in that record comprises using the identified network to connect the first mobile device and the target network device.

10. The method of claim 8, wherein the rule set comprises rules for creating the prioritized list of networks using one or more of the following criteria:
   using signal strength of a network to assign priority, wherein a network that has a higher signal strength is assigned a higher priority compare to a network that has a lower signal strength;
   assigning a higher priority to a network to which the first mobile device is currently connected;
   removing a network that is unavailable for use by the first mobile device from the prioritized list of networks;
   using security level of a network to assign priority, wherein a more secure network is assigned a higher priority to a network compared to a lesser secure network;
   determining whether network access credentials for a network to assign priority, wherein a network for which network access credentials are available is assigned a higher priority compared to a network for which network access credentials are not available;
   decreasing priority assigned to a network in proportion to the number of failed attempts to connect to the target network device using that network;
   increasing priority assigned to a network in proportion to the number of failed attempts to connect to the target network device using that network;
   using user feedback relating to a network to assign priority; or
   using performance data relating to a network to assign priority.

11. The method of claim 1, further comprising causing the processor to, if the first mobile device and the target network device cannot connect using information corresponding to one of the previously established network connections:
   access the connection server to determine whether one or more records of network connections corresponding to the target network device exist, wherein each of the one or more records comprise information associated with a network connection between the target network device and one of the plurality of other mobile devices associated with users of the connection server, and
   if one or more records of network connections corresponding to the target network device exist:
      retrieve, from the connection server, information included in each of the one or more records,
      determine whether the first mobile device and the target network device can connect using information included in one of the one or more records, and
      if the first mobile device and the target network device can connect using information included in one of the one or more records, use the transmitter component of the first mobile device to establish a new network connection between the first mobile device and the target network device using information included in that record.

12. The method of claim 1, further comprising causing the processor to, if the first mobile device and the target network device cannot connect using information included in one of the one or more records:
   use a rule set to create a prioritized list of available networks, wherein the prioritized list comprises a list of networks available to the mobile device ordered based on priority;
   determine whether the first mobile device and the target network device can connect using a network in the prioritized list of available networks, wherein the determining comprises attempting to connect the first mobile device and the target network device using each network in the prioritized list of available networks iteratively starting with a highest priority network; and
   if the first mobile device and the target network device can connect using a network in the prioritized list of available networks:
      use the transmitter component of the first mobile device to establish a new network connection between the mobile device and the target network device using that network, and
      store information corresponding to that network and the established network connection.

13. The method of claim 12, further comprising causing the processor to, if the first mobile device and the target network device cannot connect using a network in the prioritized list of available networks, prompting a user of the mobile device to identify a network and associated network parameters for establishing a new network connection between the first mobile device and the network device.

14. The method of claim 1, wherein causing the processor to receive the selection of the target network device comprises one or more of the following:
   receiving an identification of the target network device from a user;
   recognizing the target network device as being proximate to the mobile device; and
   receiving a selection of a desired service from a user.

15. A system for automatically establishing a network connection between a mobile device and a target network device, the system comprising a first mobile device, the first mobile device comprise:
   a processor; and
   a computer-readable storage medium comprising one or more programming instructions that, when executed, cause the processor to:
      receive, at a first mobile device, a selection of a target network device, wherein the selection comprises identification information corresponding to the target network device,
      determine whether the first mobile device has previously established one or more network connections with the target network device,
      if the first mobile device has previously established one or more network connections with the target network device:
         retrieve information corresponding to the one or more previously established network connections, wherein the retrieved information comprises, for each of the previously established network connections, an identification of a network used for establishing that network connection,
         determine whether the first mobile device and the target network device can connect using information corresponding to one of the previously established network connections and using a network identified for establishing that previously established network connection, and
         if the first mobile device and the target network device can connect using information corresponding to one of the previously established network connections, use a transmitter component of the first mobile device to connect the first mobile device and the target network device using information corresponding to that previously established network connection using the network identified for establishing that previously established network connection, and
      if the first mobile device has not previously established one or more network connections with the target network device:
         access a connection server to determine whether one or more records of network connections corresponding to the target network device exist, wherein each of the one or more records comprise information associated with a network connection between the target network device and one of a plurality of other mobile devices associated with users of the connection server, and
         if one or more records of network connections corresponding to the target network device exist:
            retrieve, from the connection server, information included in each of the one or more records,
            determine whether the first mobile device and the target network device can connect using information included in one of the one or more records, and
            if the first mobile device and the target network device can connect using information included in one of the one or more records, use the transmitter component of the first mobile device to establish a new network connection between the first mobile device and the target network device using information included in that record.

16. The system of claim 15, wherein:
   the target network device is a print device; and
   the computer-readable storage medium further comprises one or more programming instructions that, when executed, cause the processor to send a communication comprising a print document for printing to the print device, via the established network connection.

17. The system of claim 15, wherein the computer-readable storage medium further comprises one or more programming instructions that, when executed, cause the processor to: after connecting the first mobile device and the target network device using information corresponding to that previously established network connection, store in the connection history data file corresponding to the first mobile device, information relating to the established connection.

18. The system of claim 15, wherein the computer-readable storage medium further comprises one or more programming instructions that, when executed, cause the processor to: after connecting the first mobile device and the target network device using information included in that record, store in a data store of the connection server information relating to the established connection.

19. The system of claim 15, wherein the one or more programming instructions that, when executed, cause the processor to determine whether the first mobile device and the target network device can connect using information corresponding to one of the previously established network connections comprise one or more programming instructions that, when executed, cause the processor to:
   use a rule set to create a prioritized list of networks, wherein the prioritized list of networks comprises the identified networks ordered based on priority;
   attempt to connect the first mobile device and the target network device using each identified network in the prioritized list of networks iteratively starting with a highest priority network; and
   if the first mobile device and the target network device can successfully connect using an identified network in the prioritized list, determine that the first mobile device and the target network device can connect using information corresponding to one of the previously established network connections, wherein the identified network is associated with that previously established network connection.

20. The system of claim 19, wherein the one or more programming instructions that, when executed, cause the processor to use the transmitter component of the first mobile device to connect the first mobile device and the target network device using information corresponding to that previously established network connection comprise one or more programming instructions that, when executed, cause the processor to use the identified network to connect the first mobile device and the target network device.

21. The system of claim 19, wherein the rule set comprises rules for creating the prioritized list of networks using one or more of the following criteria:
- using signal strength of a network to assign priority, wherein a network that has a higher signal strength is assigned a higher priority compare to a network that has a lower signal strength;
- assigning a higher priority to a network to which the first mobile device is currently connected;
- using security level of a network to assign priority, wherein a more secure network is assigned a higher priority to a network compared to a lesser secure network;
- determining whether network access credentials for a network to assign priority, wherein a network for which network access credentials are available is assigned a higher priority compared to a network for which network access credentials are not available;
- decreasing priority assigned to a network in proportion to the number of failed attempts to connect to the target network device using that network; or
- increasing priority assigned to a network in proportion to the number of failed attempts to connect to the target network device using that network.

22. The system of claim 15, wherein the one or more programming instructions that, when executed, cause the processor to determine whether the first mobile device and the target network device can connect using information included in one of the one or more records comprise one or more programming instructions that, when executed, cause the processor to:
- identify a network in each of the one or more records, wherein the identified network is used for establishing the network connection corresponding to that record;
- use a rule set to create a prioritized list of networks, wherein the prioritized list comprises the identified networks ordered based on priority;
- attempt to connect the first mobile device and the target network device using each identified network in the prioritized list of networks iteratively starting with a highest priority network; and
- if the first mobile device and the target network device can successfully connect using an identified network in the prioritized list, determine that the first mobile device and the target network device can connect using information included in one of the one or more records, wherein the identified network is associated with that record.

23. The system of claim 22, wherein the one or more programming instructions that, when executed, cause the processor to use the transmitter component of the first mobile device to connect the first mobile device and the target network device using information included in that record comprise one or more programming instructions that, when executed, cause the processor to use the identified network to connect the first mobile device and the target network device.

24. The system of claim 22, wherein the rule set comprises rules for creating the prioritized list of networks using one or more of the following criteria:
- using signal strength of a network to assign priority, wherein a network that has a higher signal strength is assigned a higher priority compare to a network that has a lower signal strength;
- assigning a higher priority to a network to which the first mobile device is currently connected;
- removing a network that is unavailable for use by the first mobile device from the prioritized list of networks;
- using security level of a network to assign priority, wherein a more secure network is assigned a higher priority to a network compared to a lesser secure network;
- determining whether network access credentials for a network to assign priority, wherein a network for which network access credentials are available is assigned a higher priority compared to a network for which network access credentials are not available;
- decreasing priority assigned to a network in proportion to the number of failed attempts to connect to the target network device using that network;
- increasing priority assigned to a network in proportion to the number of failed attempts to connect to the target network device using that network;
- using user feedback relating to a network to assign priority; or
- using performance data relating to a network to assign priority.

25. The system of claim 15, wherein the computer-readable storage medium further comprises one or more programming instructions that, when executed, cause the processor to: if the first mobile device and the target network device cannot connect using information corresponding to one of the previously established network connections:
- access the connection server to determine whether one or more records of network connections corresponding to the target network device exist, wherein each of the one or more records comprise information associated with a network connection between the target network device and one of the plurality of other mobile devices associated with users of the connection server, and
- if one or more records of network connections corresponding to the target network device exist:
  - retrieve, from the connection server, information included in each of the one or more records,
  - determine whether the first mobile device and the target network device can connect using information included in one of the one or more records, and
  - if the first mobile device and the target network device can connect using information included in one of the one or more records, use the transmitter component of the first mobile device to establish a new network connection between the first mobile device and the target network device using information included in that record.

26. The system of claim 15, wherein the computer-readable storage medium further comprises one or more programming instructions that, when executed, cause the processor to: if the first mobile device and the target network device cannot connect using information included in one of the one or more records:
- use a rule set to create a prioritized list of available networks, wherein the prioritized list comprises a list of networks available to the mobile device ordered based on priority;
- determine whether the first mobile device and the target network device can connect using a network in the prioritized list of available networks, wherein the determining comprises attempting to connect the first mobile device and the target network device using each network in the prioritized list of available networks iteratively starting with a highest priority network; and if the first mobile device and the target network device can connect using a network in the prioritized list of available networks:
  use the transmitter component of the first mobile device to establish a new network connection between the mobile device and the target network device using that network, and
  store information corresponding to that network and the established network connection.

27. The system of claim 26, wherein the computer-readable storage medium further comprises one or more programming instructions that, when executed, cause the processor to: if the first mobile device and the target network device cannot connect using a network in the prioritized list of available networks, prompting a user of the mobile device to identify a network and associated network parameters for establishing a new network connection between the first mobile device and the network device.

28. The system of claim 15, wherein the one or more programming instructions that, when executed, cause the processor to receive the selection of the target network device comprise one or more programming instructions that, when executed, cause the processor to receive one or more of the following:
  receiving an identification of the target network device from a user;
  recognizing the target network device as being proximate to the mobile device; and
  receiving a selection of a desired service from a user.

* * * * *